United States Patent
Hiebl

(10) Patent No.: US 6,496,100 B1
(45) Date of Patent: Dec. 17, 2002

(54) REMOTE CONTROL KEY SYSTEM HAVING KEYLESS ENTRY FUNCTIONS AND A VEHICLE IMMOBILIZING FUNCTION IN COMMON KEYHEAD

(75) Inventor: Johann Hiebl, Bernhardswald (DE)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/392,946

(22) Filed: Sep. 9, 1999

Related U.S. Application Data

(60) Provisional application No. 60/099,573, filed on Sep. 9, 1998.

(51) Int. Cl.[7] .............................. H04Q 9/00; G06F 7/04
(52) U.S. Cl. ...................... 340/5.31; 340/5.6; 340/5.61; 340/825.69; 340/425.5; 307/10.3
(58) Field of Search .................................. 340/5.31, 5.1, 340/5.61, 5.6, 5.7, 5.72, 425.5, 426, 825.69, 825.72; 307/10.1, 10.3

(56) References Cited

U.S. PATENT DOCUMENTS

| 4,835,407 A | 5/1989 | Kataoka et al. ............. 307/105 |
|---|---|---|
| 5,736,935 A | 4/1998 | Lambropoulos ....... 340/825.69 |
| 5,808,372 A * | 9/1998 | Schwegler et al. ........ 307/10.3 |
| 6,191,703 B1 * | 2/2001 | Wallace .................. 340/825.69 |

FOREIGN PATENT DOCUMENTS

| DE | 195 39 851 | 6/1997 |
|---|---|---|
| EP | 0 570 761 | 11/1993 |
| FR | 2 707692 | 1/1995 |

* cited by examiner

*Primary Examiner*—Donnie L. Crosland

(57) ABSTRACT

A system for preventing inadvertent operation of remote keyless entry commands for a vehicle remote keyless entry system having a user interface located on the head of the vehicle ignition key. Whenever the ignition key is about to or has been inserted into the vehicle ignition, the user may inadvertently depress one or more of the command buttons of the keyhead. This accidental depression may occur before or during inserting the key, or after the key has been inserted and the key is being turned to activate the ignition. The system of the present invention selectively inhibits the vehicle from acting upon the commands when it is believed any of these situations may be occurring.

10 Claims, 1 Drawing Sheet

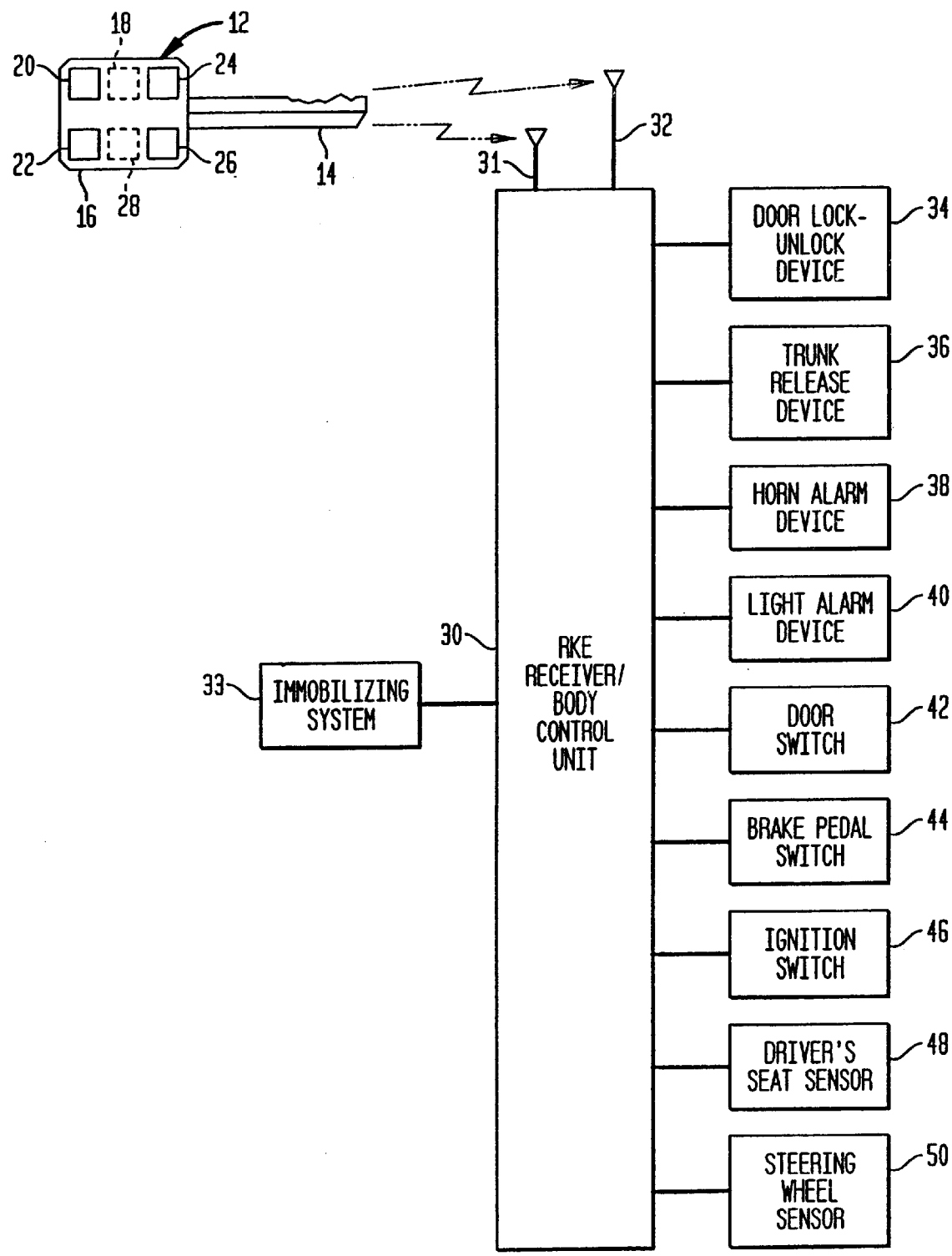

REMOTE CONTROL KEY SYSTEM HAVING KEYLESS ENTRY FUNCTIONS AND A VEHICLE IMMOBILIZING FUNCTION IN COMMON KEYHEAD

RELATED APPLICATIONS

This application claims priority from U.S. provisional application No. 60/099,573, filed Sep. 9, 1998.

FIELD OF THE INVENTION

This invention relates to vehicle remote control, anti-theft or immobilizing systems and, more particularly, to a remote control key system having a key that incorporates remote control functions and immobilization features into the keyhead of the key and which prevents operation of the remote control functions at certain times.

BACKGROUND OF THE INVENTION

A conventional remote keyless entry (RKE) transmitter is generally in the form of keyfob that hangs from a key ring. Typical RKE transmitters include a plurality of buttons or switches which, when depressed, initiate corresponding vehicle control functions remotely. For example, RKE transmitters may include four buttons: a door lock button for locking the vehicle doors, a door unlock button for unlocking the vehicle doors, a trunk release button for releasing the vehicle trunk, and a panic button for sounding the horn of the vehicle and/or flashing the vehicle's lights to draw attention to the vehicle.

In addition to the convenience offered by RKE transmitters, anti-theft systems are commonly employed to immobilize a vehicle. A popular anti-theft system utilizes a transponder embedded in a keyhead portion of a key and a receiver located at the ignition lock. When the key is placed in the ignition lock, and if the identifying signal transmitted by the transponder and received by the receiver is determined not to be a match a preset identifying code stored at the vehicle, an immobilizing system is activated to prevent operation of the vehicle.

Integration of both the immobilizer system and the RKE system into a keyhead of a vehicle key has been proposed. However, when RKE buttons are integrated into a keyhead, there is a risk of pushing a transmitter button while turning the keyhead in the ignition lock, inadvertently initiating a vehicle control function. One approach to overcome this problem is to disable the RKE system as soon as the key is in the lock of as soon as the key is turned to the accessory or ignition position. However, even when these measures are taken, there is still a possibility of inadvertently pushing a transmitter button just before inserting the key into the lock or before turning the key to the ignition position and, in so doing, initiating a control function at an inappropriate time.

Accordingly, when RKE functions are provided in a keyhead of a vehicle key, there is a need to provide a means of preventing inadvertent RKE operations when the key is being handled to start the engine of the vehicle.

SUMMARY OF THE INVENTION

The present invention fulfills the need described above by providing a remote control system for a vehicle. The system includes a key having a keyplate to be received in the vehicle's ignition lock and a keyhead coupled to the keyplate. At least one switch is on the keyhead to be digitally actuated to initiate a control function of the vehicle remotely. Transmission structure is disposed in the keyhead and is associated with the switch to transmit an atmospheric propagation signal containing an identification code. Receiving structure, located on the vehicle, receives the atmospheric propagation signal. A controller, provided on the vehicle, outputs a control signal for effecting the control function associated with the switch on the keyhead. Sensing structure, associated with the controller, indicates when a driver of the vehicle is in position to operate the vehicle. The controller prevents the control function form occurring upon actuation of the at least one switch when the sensing structure indicates that a driver is in position to operate the vehicle, this includes the times both prior to, during and immediately following insertion of the keyplate into the ignition lock.

In another aspect of the invention, the keyhead further includes a transponder having an associated code. The ignition lock includes a receiver associated with the controller. The controller compares a coded signal sent by the transponder and received by the receiver with a set point signal. If the coded signal matches the set point signal, the controller permits ignition to occur and, if the coded signal does not match the set point signal, the controller initiates a vehicle immobilizing system. The controller prevents control functions from occurring when communication between the transponder and the receiver can occur. This prevention may take effect before, during or after insertion of the key into the ignition lock.

Method of preventing inadvertent operation of remote keyless entry functions when a user is in position to operate the vehicle are also provided.

Other objects, features and characteristics of the present invention, as well as the methods of operation and the functions of the related elements of the structure, the combination of parts, and economics of manufacture will become more apparent upon consideration of the following detailed description and appended claims with reference to the accompanying drawing, all of which form a part of this specification.

BRIEF DESCRIPTION OF THE DRAWING

FIG. 1 is a block diagram of a remote control key system provided in accordance with the principles of the present invention.

DETAILED DESCRIPTION OF THE INVENTION

With reference to FIG. 1, a remote control key for use with a remote control system, provided in accordance with the principles of the present invention, is shown generally indicated at 10. FIG. 1 is a schematic block diagram of an electrical arrangement wherein a remote control key, generally indicated at 12, is formed of a key plate 14 and a keyhead 16. Keyhead 16 includes transmission structure in the form of a built-in transmission circuit 18. In accordance with the principles of the present invention, the keyhead 16 is provided with a locking switch 20, an unlocking switch 22, a panic switch 24, and trunk release switch 26. Such keyheads and their associated vehicle systems are commonly referred to as Remote Keyless Entry, or RKE, systems. As is well understood by those of ordinary skill in the art, the switches of an RKE system need not be configured as shown in FIG. 1, but may be positioned on keyhead 16 in any suitable configuration. Furthermore, more or fewer switches associated with other or different functions may be provided within the scope of the present invention.

As illustrated in this embodiment, when one of the switches 20–26 is depressed by a user, one of four signals is sent. There is a locking signal, an unlocking signal, a trunk release signal, and an alarm signal. Each signal may be comprised of a string of binary digits. The appropriate signal is transmitted remotely from the transmission circuit 18. In the present embodiment, the signal is atmospherically propagated, and may take the form of either an infrared signal or radio transmission. However, other means of communicating may be used. Each signal, or message, may further contain an associated identification (or "ID") code. Each ID code represents one or more binary digital signals and is set for a particular vehicle. The ID codes associated with systems of the present invention include, without limitation, rolling codes (in which more than one, e.g., 500, codes are authorized by the vehicle), as well as encrypted codes. In addition, the same ID code is stored by the vehicle so as to enable authentication of transmitted signals, as more fully described below.

An RKE receiver/body unit 30 (which may be referred to below as "controller" or "control unit" 30) defines a controller and includes a processor, such as a microprocessor, microcomputer, or similar device. Within this controller resides one or more memories or registers. These registers preferably contain the binary codes for the RKE action signals, which in this embodiment are door lock, door unlock, trunk release and panic alarm activate. These action signals may be commonly referred to also as RKE functions or commands. The registers of the controller 30 preferably also include the vehicle-specific ID code. The ID code contained in the control unit 30 must match that of the ID code sent by the transmitter 18 in order for the action signals, or commands, to be acted upon. The control unit 30, as described here, is provided separately from, but may be associated, with an engine control unit (which may be part of immobilizing system 33, described below). Alternate suitable configurations of the vehicle controllers consistent with the functionality described herein are also contemplated and covered by the present invention.

In the illustrated embodiment, the keyhead 16 also includes a built-in transponder 28, which may, without limitation, be a transponder capable of supporting encryption algorithms (e.g., a crypto transponder system). A user-specific code is stored in memory in the transponder 28. In the illustrated embodiment, the transponder 28 is of the type disclosed in U.S. Pat. No. 5,729,057, the content of which is hereby incorporated by reference into the present specification. Thus, a receiver in the form of an antenna 31 is preferably disposed around a lock cylinder of an ignition lock (not shown). When the key plate 14 comes into proximity of or is introduced into the ignition lock, the control unit 30 generates a question or start signal that is transmitted through the antenna 31 to the transponder 28. The transponder 28 thereupon responds with a coded answer signal. The coded answer signal is received by the antenna 31, sent to the control unit 30, and evaluated by the control unit. The answer signal is compared with a stored code in the control unit 30 and, if the two codes do not correspond, an immobilizing system 33 in the vehicle is turned on. The immobilizing system 33 is designed to inhibit the starting of the vehicle. As can be appreciated by those of ordinary skill in the art, the immobilizing system 33, or immobilizer, may contain or otherwise be associated with an engine control unit. It may also be an ignition coil, a starter, a shut-off valve or the like. The immobilizing system 33 serves to permit starting of the vehicle's engine only when authorization is proved. As such, the immobilization feature herein described may also take the form of simply preventing the ignition from communicating the signal necessary to start the engine.

As such, the immobilizer would take the form of the engine ignition system normally being in the inhibited state, and the system changing to the enabled state only upon authentication between the transponder 28 and the control system 30. The transponder 28 and the controller 30, via its receiver antenna 31, may communicate, without limitation, via infrared or radio transmission or by inductively coupled coils (which may be characterized, for example, by transmission at 125 kHz).

The transponder 28 is configured such that communication between it and the antenna 31 occurs only when the key containing the transponder 28 is sufficiently near or in the ignition lock. This configuration could be achieved by limiting the receiving range of the transponder 28 or by enabling it to communicate only if the received signal strength from the receiver antenna 31 is below a preselected threshold.

If vehicle immobilization is not desired, the transponder 28 need not be provided in the keyhead 16 and the ignition lock need not contain antenna 31. Or, alternatively, the transponder 28 and antenna 31 may still be provided, but the immobilization system 33 may be omitted. In that way, the transponder 28 and antenna 31 would still be available for use in selectively inhibiting RKE functions as described in greater detail below.

With regard to the remote control functions of the remote control key 12, the atmospheric propagation signal is received via receiving structure in the form of an antenna 32 by the control unit 30 of the vehicle. When a switch 20–26 is depressed by the user, a corresponding signal comprising the appropriate command and the ID code is broadcast by the transmitter 18. The signal is received by the antenna 32, conveyed to the control unit 30 and interrogated by the control unit 30. The signal is interrogated for two features: whether the ID code is authentic, and whether the command is a recognized command. If the ID code is authentic and the command is recognized as one of the permissible commands, the command is implemented. However, if the ID code is not found to be authentic, the command is not implemented even if the command is recognized. Likewise, if the ID code is found to be authentic but the command is not recognized, no command is implemented. Further regarding authentication of the ID code, the inhibition of the implementation of the command can take two forms. The command can be compared to see if it is recognized, and a decision can be made to forgo implementing it when the ID code does not authenticate. On the other hand, the step of recognizing the command can be forgone if the ID code does not authenticate.

When the locking switch 20 or the unlocking switch 22 is depressed on the key 12, the respective lock or unlock signal and ID code are broadcast by the transmitter 18. The antenna 32 receives the signal, and conveys it to the controller 30 for interrogation. If the ID code of the transmitted signal matches the ID code stored at the control unit 30, a door locking/unlocking device 34 receives the respective locking or unlocking signal from the control unit 30. As such, the door lock/unlock device 34 drives a door locking mechanism (not shown) so as to cause the mechanism to perform the locking or unlocking operation according to the control signal. In a similar manner, when the trunk release switch is depressed and if the ID code of the transmitted signal matches the ID code stored at the control unit 30, a trunk release device 36 receives a trunk release signal from the control unit 30 and a trunk release mechanism (not shown) to perform a releasing operation. In addition, a horn alarm device 38 and a light alarm device 40 are connected to the electronic control unit 30. When the panic switch is depressed on the key 12, it is because the user desires to draw attention to the vehicle. As such, if the ID code of the transmitted signal matches the ID code stored at the control unit 30, the horn alarm device 38 sounds the vehicle's horn and the light alarm device 40 flashes the vehicle's lights on and off according to an alarm signal given by the control unit 30.

Since, in accordance with the invention, the RKE functions are incorporated into the keyhead 16 of the ignition key 12 of a vehicle, it is important to prevent inadvertent RKE operations when the key 12 is being inserted into the ignition lock to start the vehicle. Thus, in accordance with the principles of the invention, the following methods of preventing inadvertent RKE operations may be provided alone, or in combination.

In a first embodiment, the control unit 30 is programmed to delay the execution of the RKE functions for a preset time, e.g., 200 ms, to allow for the user to insert the key and turn it to start the engine without also inadvertently operating the RKE features. The controller 30 may alternatively be programmed to ignore any received RKE functions for a similar such period of time if the key 12 is inserted into the ignition lock or, following insertion, is turned to the ignition position. The system may also be configured so that all RKE commands are always ignored for so long as the key 12 is in the ignition. In all such cases, an ignition sensor or switch 46 is used to determine the presence of the key 12 in the ignition.

In a further embodiment, the aforementioned delay feature is available for a preselected time (e.g. 2 seconds or less) after the driver's door has been closed. Accordingly, sensing structure in the form of a door sensor or switch 42 is provided for detecting the operation of opening and closing of the driver's door.

In another embodiment, a sensing structure in the form of a brake pedal sensor or switch 44 is provided. The RKE functions are cancelled by the control unit 30 if the brake pedal has been depressed. This cancellation may include a delay feature similar to that described above in conjunction with the door switch 42 and ignition switch 46 as described above.

In another embodiment, a sensing structure in the form of a driver's seat sensor 48 is provided. If the seat sensor 48 determines that a driver is sitting in the seat, the control unit 30 will not implement any RKE commands. The driver's seat sensor 48 may be part of an airbag system of the vehicle or may be a separate weight, infrared, or ultrasonic sensor associated with the driver's seat.

In yet another embodiment, a steering wheel sensor 50 is provided. The RKE functions are cancelled by the control unit 30 if movement of the vehicle's steering wheel has occurred as determined by the steering wheel sensor 50. The steering wheel sensor 50 may be part of an anti-lock brake system or may be a separate sensor associated with a steering wheel.

It can be appreciated by one of ordinary skill that it may be desirable to combine two or more of these sensors and switches 42–50 to provide for redundant signals. For example, the RKE functions may be inhibited only when both the ignition switch 42 indicates the presence of the key 12 and when the driver seat sensor 48 indicates the driver is sitting in the seat. One of ordinary skill can further appreciate that RKE function inhibition may take the form of delaying acting upon an otherwise validly received command, temporarily ignoring such commands, or always ignoring such commands while the sensing signals are present.

In yet another embodiment, the control unit 30 will not execute any RKE function if the transponder 28 is communicating with the receiver 31. It should be recalled that the transponder 28 and receiver 31 communicate for the purpose of authentication to determine whether vehicle ignition should be immobilized. This communication may only occur when the key 12 is in or near the ignition lock. As such, one may program the controller 30 to either temporarily delay, to temporarily ignore or to always ignore RKE commands whenever the transponder 28 and receiver 31 are communicating.

Thus, the invention provides an effective means of preventing operation of a RKE control function when a button or switch on the keyhead may be inadvertently actuated when the driver is in position to operated the vehicle.

The foregoing description has set forth how the objects of the present invention can be fully and effectively accomplished. The embodiments shown and described for purposes of illustrating the structural and functional principles of the present invention, as well as illustrating the methods of employing the preferred embodiments, are subject to change without departing from such principles. Therefore, this invention includes all modifications encompassed within the spirit of the follow claims.

I claim:

1. A remote control system for a vehicle having an ignition for causing a power plant of said vehicle to be started to permit mobility of said vehicle and at least one vehicle door adapted for movement between an open and a closed position, the system comprising:

a lock associated with said ignition, said lock having a locked and unlocked state, said vehicle power plant being disabled from starting until said ignition lock is in said unlocked state;

an ignition key adapted for cooperation with said ignition lock for selectively urging said ignition lock between said locked and unlocked states;

a proximity approximator associated with said key and said ignition, said approximator adapted to determine when said key is within a predetermined proximity of said ignition and a vehicle door position sensor that is adapted to sense the opening and closing of the vehicle door; and a user interface associated with said key, said interface adapted to permit a user to communicate at least one signal to said system while remote from said vehicle, said communicated signal being acted upon by said system in a preselected manner and said communicated signal not being acted upon by said system whenever said approximator indicates that said key is within said predetermined proximity of said ignition.

2. The system of claim 1, wherein the system does not respond to the communicated signal for a selected amount of time after the position sensor senses that the door has been closed.

3. A remote control system for a vehicle having an ignition for causing a power plant of said vehicle to be started to permit mobility of said vehicle and a brake pedal adapted to be selectively depressed by a vehicle user, the system comprising:

a lock associated with said ignition, said lock having a locked and unlocked state, said vehicle power plant being disabled from starting until said ignition lock is in said unlocked state;

an ignition key adapted for cooperation with said ignition lock for selectively urging said ignition lock between said locked and unlocked states;

a proximity approximator associated with said key and said ignition, said approximator adapted to determine when said key is within a predetermined proximity of said ignition and a brake pedal sensor adapted to sense when the brake pedal is depressed; and a user interface associated with said key, said interface adapted to permit a user to communicate at least one signal to said system while remote from said vehicle, said communicated signal being acted upon by said system in a preselected manner and said communicated signal not being acted upon by said system whenever said approximator indicates that said key is within said predetermined proximity of said ignition.

4. The system of claim 3, wherein the system does not respond to the communicated signal for at least a selected period of time after the brake pedal sensor has sensed that the brake pedal has been depressed.

5. A remote control system for a vehicle having an ignition for causing a power plant of said vehicle to be started to permit mobility of said vehicle and a steering wheel adapted for rotational movement, the system comprising:

a lock associated with said ignition, said lock having a locked and unlocked state, said vehicle power plant being disabled from starting until said ignition lock is in said unlocked state;

an ignition key adapted for cooperation with said ignition lock for selectively urging said ignition lock between said locked and unlocked states;

a proximity approximator associated with said key and said ignition, said approximator adapted to determine when said key is within a predetermined proximity of said ignition and a steering wheel sensor adapted to sense when a user rotates the steering wheel; and a user interface associated with said key, said interface adapted to permit a user to communicate at least one signal to said system while remote from said vehicle, said communicated signal being acted upon by said system in a preselected manner and said communicated signal not being acted upon by said system whenever said approximator indicates that said key is within said predetermined proximity of said ignition.

6. The system of claim 5, wherein the system does not respond to the communicated signal for at least a selected period after the steering wheel sensor indicates that the steering wheel has been turned.

7. A remote control system for a vehicle having an ignition for causing a power plant of said vehicle to be started to permit mobility of said vehicle and at least one seat, the system comprising:

a lock associated with said ignition, said lock having a locked and unlocked state, said vehicle power plant being disabled from starting until said ignition lock is in said unlocked state;

an ignition key adapted for cooperation with said ignition lock for selectively urging said ignition lock between said locked and unlocked states;

a proximity approximator associated with said key and said ignition, said approximator adapted to determine when said key is within a predetermined proximity of said ignition and comprising a sensor adapted to sense when a user is seated in the seat; and a user interface associated with said key, said interface adapted to permit a user to communicate at least one signal to said system while remote from said vehicles said communicated signal being acted upon by said system in a preselected manner and said communicated signal not being acted upon by said system whenever said approximator indicates that said key is within said predetermined proximity of said ignition.

8. The system of claim 7, wherein the system will not respond to the communicated signal when the sensor indicates that the user occupies the seat.

9. A remote control system for a vehicle having an ignition for causing a power plant of the vehicle to be started to permit mobility of the vehicle, the system comprising:

a lock associated with the ignition, said lock having a locked and unlocked state, the vehicle power plant being disabled from starting until said ignition lock is in said unlocked state;

an ignition key adapted for cooperation with the ignition lock for selectively urging the ignition lock between the locked and unlocked states;

a proximity approximator associated with the key and the ignition, the approximator adapted to determine when the key is within a predetermined proximity of the ignition; and a user interface associated with the key that is adapted to permit a user to communicate at least one signal to the system while remote from the vehicle, the communicated signal being acted upon by the system in a preselected manner when the key is not within the predetermined proximity of the ignition, the communicated signal not being acted upon by the system for a predetermined delay period when the approximator indicates that the key is within the predetermined proximity of the ignition, after which delay period the communicated signal is acted upon by the system regardless of whether the approximator continues to indicate that the key is still within the predetermined proximity of the ignition.

10. The system of claim 9, wherein the system responds to a future communicated signal after the predetermined delay period regardless of whether the approximator continues to indicate that the key is still within the predetermined proximity of the ignition.

* * * * *